(12) United States Patent
Tsunematsu (10) Patent No.: US 8,422,774 B2
(45) Date of Patent: Apr. 16, 2013

(54) IMAGE PROCESSING METHOD, IMAGE PROCESSING APPARATUS AND PROGRAM STORAGE MEDIUM

(75) Inventor: Yuuichi Tsunematsu, Kowloon (HK)

(73) Assignee: Canon Kabushiki Kaisha, Tokyo (JP)

( * ) Notice: Subject to any disclaimer, the term of this patent is extended or adjusted under 35 U.S.C. 154(b) by 218 days.

(21) Appl. No.: 13/050,097

(22) Filed: Mar. 17, 2011

(65) Prior Publication Data
US 2011/0235903 A1    Sep. 29, 2011

(30) Foreign Application Priority Data

Mar. 23, 2010 (JP) ................................ 2010-066346

(51) Int. Cl.
*G06K 9/00* (2006.01)
*G06K 9/34* (2006.01)
(52) U.S. Cl.
USPC ........................... 382/164; 382/197; 382/202
(58) Field of Classification Search .................. 382/164, 382/173, 180, 197, 199, 202, 258
See application file for complete search history.

(56) References Cited

U.S. PATENT DOCUMENTS

| 5,809,179 | A  | * | 9/1998  | Marimont et al. | 382/254 |
| 7,391,917 | B2 | * | 6/2008  | Ohta et al.     | 382/253 |
| 7,623,712 | B2 | * | 11/2009 | Dai et al.      | 382/180 |
| 7,664,321 | B2 | * | 2/2010  | Fukuoka et al.  | 382/181 |
| 7,873,218 | B2 | * | 1/2011  | Uzawa           | 382/199 |
| 8,041,122 | B2 | * | 10/2011 | Ishida et al.   | 382/197 |
| 2008/0002889 | A1 | * | 1/2008 | Shimada et al.  | 382/197 |
| 2008/0137961 | A1 |   | 6/2008 | Ishida et al.   |         |
| 2010/0033745 | A1 |   | 2/2010 | Dai et al.      |         |
| 2010/0135575 | A1 | * | 6/2010 | Guo et al.      | 382/164 |

FOREIGN PATENT DOCUMENTS

| JP | 2004-265384 A | 9/2004  |
| JP | 2005-310070 A | 11/2005 |
| JP | 2006-344069 A | 12/2006 |
| JP | 2008-146496 A | 6/2008  |

* cited by examiner

*Primary Examiner* — Phuoc Tran
(74) *Attorney, Agent, or Firm* — Fitzpatrick, Cella, Harper & Scinto (57) ABSTRACT

Vectorization of an image in which a monospaced line and surfaces coexist without generation of a gap in a boundary between the monospaced line and the surfaces or between the surfaces, is realized. Separation processing of the monospaced line and the surface is executed for each color region. After the separation, a pixel position where the monospaced line is located is filled with color information of an adjacent surface. Boundary-sharing type vectorization processing is executed for data which is obtained by filling the monospaced line. Further, vector data expressed by a core line and a line width is generated based on the monospaced line obtained by separation processing of the monospaced line and surface. A vectorization result of the monospaced line extracted according to each color, and a vectorization result of a boundary line of the surface generated from data after a monospaced line region is filled are outputted.

8 Claims, 7 Drawing Sheets

IMAGE PROCESSING METHOD, IMAGE PROCESSING APPARATUS AND PROGRAM STORAGE MEDIUM

BACKGROUND OF THE INVENTION

1. Field of the Invention

The present invention relates to an image processing method, an image processing apparatus and a program storage medium, and particularly to a technology of separating image input such as illustrations and line images into a monospaced line (i.e. a line having a constant line width) and surfaces, and applying vectorization processing suitable for each of them to achieve both high image quality and reusability. Among the separated information, for the monospaced line, center line coordinates are vectorized to add line width information, and for the surfaces, the contour coordinates are vectorized. The vector data is outputted so that the monospaced line is on the top in the display sequence after the region where the monospaced line is located is filled, thus preventing a gap due to vectorization from being generated in the rendered image.

2. Description of the Related Art

In recent years, due to progress in computerization of information, there have been widely spread systems which do not store paper documents as they are, but store the paper documents by converting them into electronic forms by scanners or the like and transmit the electronic data to the other apparatuses. In such systems, high compression of the documents converted into electronic forms is required for the purpose of reducing the transmission cost or the like. Meanwhile, compression of electronic data generally causes degradation of image information, and therefore, reusability that enables the electronized data to be partially edited, and maintenance of high image quality even after enlargement and reduction of the data are required. In order to satisfy the two requirements, various compression methods are proposed, and in some cases compression is incompatible with image quality. For example, when a character region and a photograph region coexist in document data, there arises the problem that if the compression suitable for the character region is performed, the image quality is retained, but the compression rate becomes low, whereas if the compression suitable for the photograph region is performed, the compression rate can be made high, but the image quality of the character region is degraded.

Therefore, there is proposed the method which realizes high compression, reuse and high image quality of a document image by splitting the document data into a character region and a photograph region, and applying processing suitable for each of them (refer to Japanese Patent Laid-Open No. 2009-265389). More specifically, the character region in which primary importance is placed on reusability and high image quality is converted into vector data, and the other region such as a photograph region which cannot be easily reproduced by vectorization is compressed in accordance with JPEG.

Further, there is proposed the method which executes vectorization processing for not only character images but also graphic images (an illustration, and clip art, which are generally called line images) which are characterized by being configured by several uniform colors and having clear contours, as a target of vectorization processing (refer to Japanese Patent Laid-Open No. 2006-344069). In the method proposed here, after the number of colors of the inputted image is reduced by using the similarity of colors, the contour coordinates of each color region are extracted, and functional approximation is performed.

The method for performing the functional approximation for the extracted contour coordinates is disclosed in Japanese Patent Laid-Open No. 2005-310070. In this case, the contour coordinates are divided at the points which satisfy the following conditions:

The first angular point: a point at which the change of the vectors connecting the adjacent point sequences becomes an acute angle The second angular point: points at both ends in the case of the distance between the consecutive points being larger than a certain threshold value Inflection point: the point at which the sign of the outer product of the consecutive vectors changes, and a Bezier curve is applied to the divided sections, whereby the functional approximation is performed.

Japanese Patent Laid-Open No. 2008-196496 discloses the boundary sharing type vectorization method which extracts the common boundary lines among the color regions, performs functional approximation for each of the boundary lines, and outputs the approximation results by connecting them so as to be originally arranged for each color region. Since the approximation result in common between the color regions is used, a gap is not generated in principle.

Figure 3:
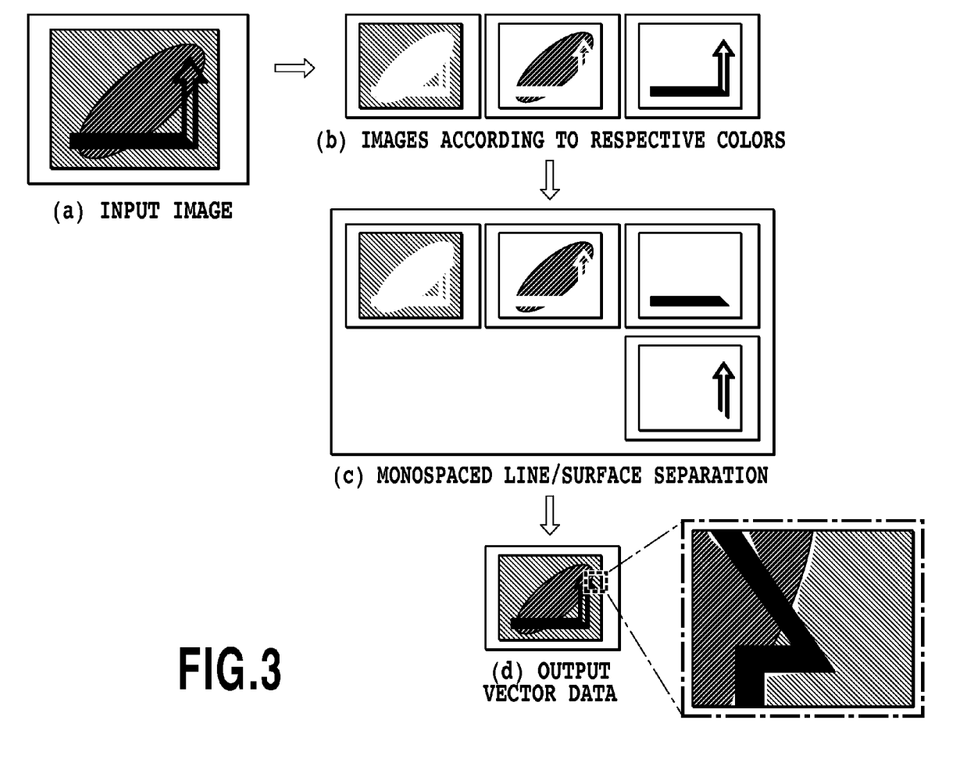
FIG. 3 is an example of generation of gaps at the time of performing vectorization for each color.

However, when vectorization is performed, in some cases a gap is generated between the color regions of the image which is obtained by rendering the data obtained as a result of vectorization. This gap is generated when the contour extracted from the color region is individually subjected to functional approximation for each region, and at the time of vectorization of the input by dividing the input into a monospaced line and surfaces. An example of a gap generated in the rendering result for the reason of the latter is shown in FIG. 3. When the inputted image shown in FIG. 3 (a) is divided according to each color, it is divided into three color regions as shown in FIG. 3 (b). FIG. 3 (c) shows the result of dividing each of the color regions into a monospaced line and surfaces. The two color regions at the left are determined as having no monospaced line region. The color region illustrated at the rightmost side is determined as including a monospaced line portion, and is split into the surface and the monospaced line. The images illustrated on the upper stage of FIG. 3 (c) show surfaces, and the image illustrated on the lower stage shows the monospaced line. When the centerline coordinates of the monospaced line and the contour coordinates of the surface shown in FIG. 3 (c) are acquired, subjected to functional approximation and then are outputted as vector data, the result is as shown in FIG. 3 (d). A part of the image obtained by rendering the vector data is displayed as enlarged at the right side of FIG. 3 (d). In the outputted vector data, generation of gaps can be confirmed between the monospaced line and the surface, and between the surfaces.

Generation of the gap can be prevented by vectorizing the boundary lines of the color regions instead of the contours of the color regions, and thereafter connecting the boundary lines. However, with regard to the monospaced line, vector data is frequently desired to be expressed by the information of the center line and the line width of the monospaced line. Accordingly, when the center line coordinates of the monospaced line are vectorized even in a partial region of the input, only the method of vectorizing the boundary line of a color region cannot be applied. The boundary position in the case of rendering a line with a line width normally changes depending on the precision and implementation of the renderer, and an accurate value of the boundary position cannot be obtained in advance. Even if an accurate boundary position is obtained, it is very difficult to perform functional approximation so that a gap is not generated.

SUMMARY OF THE INVENTION

In order to solve the above described problem, an image processing apparatus according to the present invention comprises an image input unit for inputting an image including one or more color regions, a color region dividing unit for dividing the inputted image into regions according to respective colors, a monospaced line/surface separating unit for separating each of the divided color regions into a monospaced line region and a surface region, a monospaced line region filling unit for obtaining a union of the surface regions of the respective color regions separated by the monospaced line/surface separating unit, and filling an region where the separated monospaced line region is present in an image of the obtained union with a color of a surface region adjacent to the region, and a vectorization unit for generating vector data of a monospaced line based on the monospaced line region separated by the monospaced line/surface separating unit and further generating vector data of the surface region based on a contour of a surface region extracted from an image having been filled by the monospaced line region filling unit.

According to the present invention, vectorization of an image in which the monospaced line and the surface coexist can be realized without generation of a gap in a boundary between the monospaced line and the surface or between the surfaces.

Further features of the present invention will become apparent from the following description of exemplary embodiments (with reference to the attached drawings).

DESCRIPTION OF THE EMBODIMENTS

Hereinafter, an embodiment of the present invention will be described with reference to the accompanying drawings. However, the components described in the embodiment are only illustrated examples, and the technical scope of the present invention is defined by claims and is not limited by the following individual embodiment.

Embodiment 1

Figure 2:
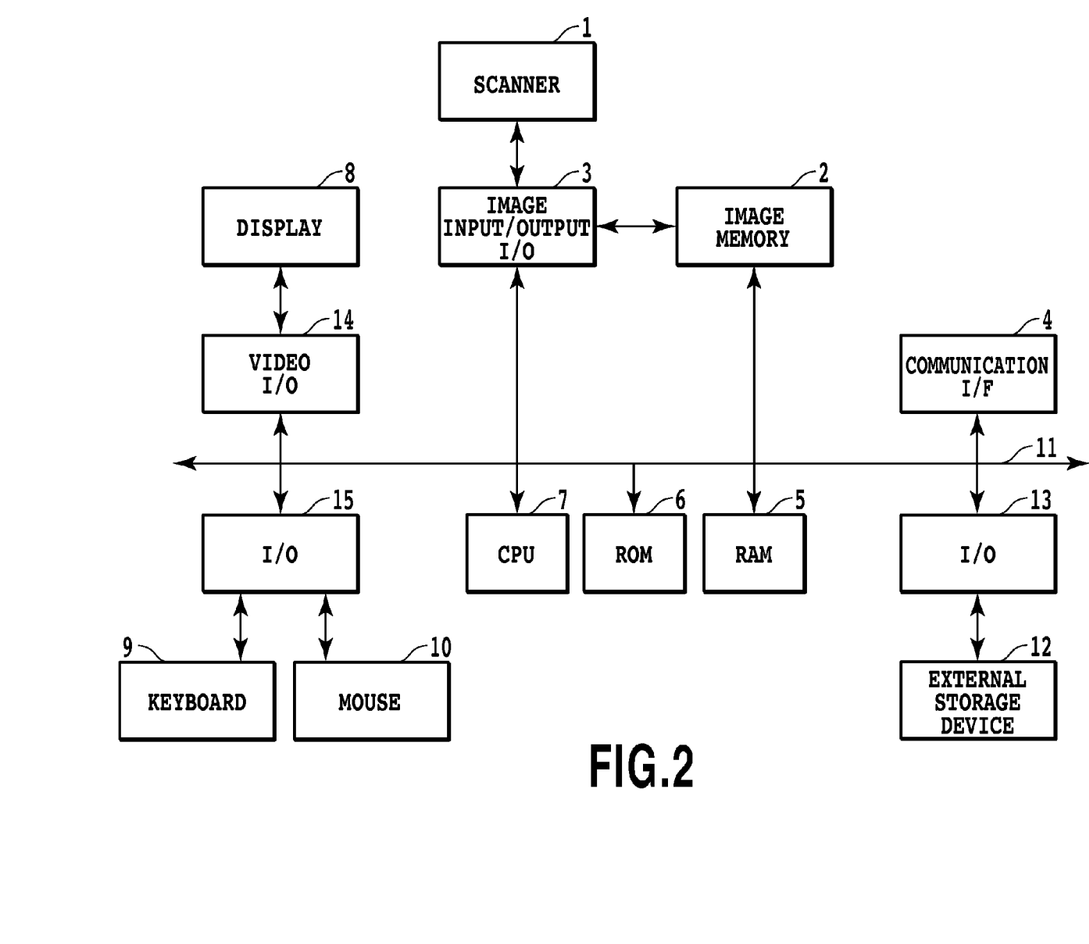
FIG. 2 is a block diagram of the information processing apparatus in the embodiment of the present invention.

The configuration example of an image processing apparatus of the present embodiment will be described with reference to a block diagram of FIG. 2. In FIG. 2, a Central Processing Unit (CPU) 7 controls an entire apparatus. A Read Only Memory (ROM) 6 stores programs and parameters which do not need change. A Random Access Memory (RAM) 5 temporarily stores programs and data supplied from external devices and the like. A scanner 1 acquires electronic image data by photoelectrically scanning a document or the like, and through an image input/output I/O 3, the image data is transmitted to the CPU 7 or the like via a system bus 11. An image memory 2 holds the image data or the like read by the scanner 1. An external storage device 12 includes a hard disk and a memory card fixedly installed, or a removable flexible disk (FD) and an optical disk such as a compact disk (CD), a magnetic or optical card, an IC card, a memory card and the like. These external storage devices 12 transmit and receive data to and from the CPU and the like through an I/O 13 and a bus 16. An I/O 15 receives data from an input device such as a pointing device 10 such as a mouse and a keyboard 9 which input data according to an operation of a user. A video I/O 14 sends data to a display monitor 8 for displaying data held by or supplied to the image processing apparatus. A communication I/F 4 is means for connecting to a network line such as the Internet. The system bus 11 communicably connects the respective units of the image processing apparatus of the present embodiment.

The processing of the present embodiment which will be described in detail below is executed by basically using the method as follows. First, a monospaced line (i.e. a line having a constant line width) and a surface are separated from the inputted image, and vectorization suitable for each of them is applied. A specific color of the inputted image is regarded as a binary image, thinning of the binary image processing and distance transformation are combined, the center line coordinates and the line width information of the monospaced line are generated, and the center line is subjected to functional approximation, which thereafter, is outputted in combination with the line width information. Further, the region which is obtained by excluding the monospaced line from the inputted image based on the information of them is separated, which is dealt as a surface, and the contour coordinates of the surface are extracted to be subjected to functional approximation. By performing processing separately for the monospaced line and the surface, the vector data in a smaller data size without generation of a strain to the monospaced line can be obtained with respect to the image including a large number of monospaced lines, such as a drawing.

Figure 1:
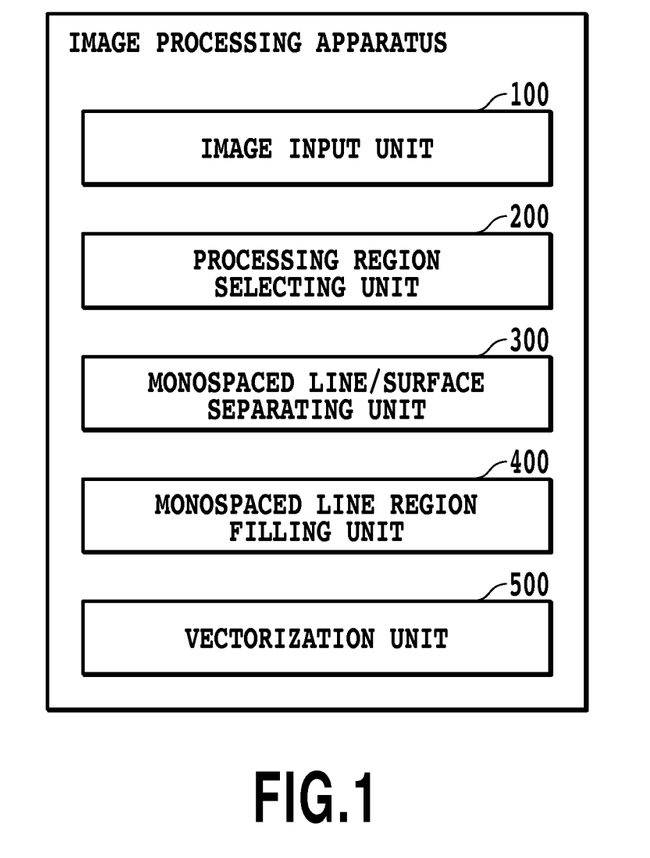
FIG. 1 is a block diagram of main processing of an information processing apparatus in an embodiment of the present invention.
Figure 4:
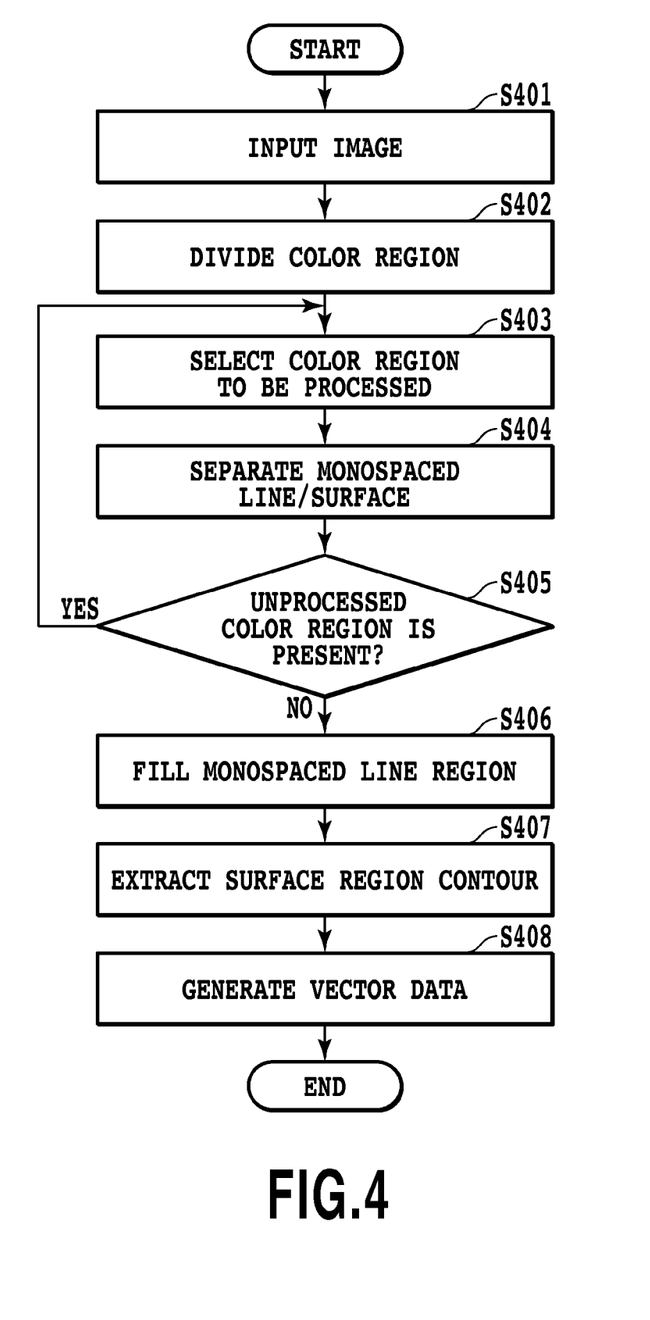
FIG. 4 is a flowchart in the embodiment of the present invention.

Next, the processing procedure for realizing the invention of the present application according to programs executed on the CPU 7 will be described more specifically with reference to the block diagram of FIG. 1 and the flowchart of FIG. 4. When the processing is started in step S401, the image data which will be an object to be processed is inputted. In regard with image input, the image data read by the scanner 1 is taken in the apparatus via the image input/output I/O 3. Further, the processing target image data may be inputted from the outside of the apparatus via the communication I/F 4, or the image data in advance stored in the external storage device 12 may be read via the I/O 13. The inputted processing target image data is retained in the image memory 2.

Next, in step S402, color region division processing for dividing the image data into a region of each color is executed for the retained image data. Here, the method disclosed in Patent Document 2 can be applied, which configures a cluster of each color from the pixels in the inputted image, integrates the clusters with similar colors and the clusters considered to be noise with the adjacent clusters, and thereby, removes scan noise. The cluster of each color after removal of the noise can be divided as a region of each color. The above processing is implemented as an image input unit 100 in FIG. 1.

Figure 5:
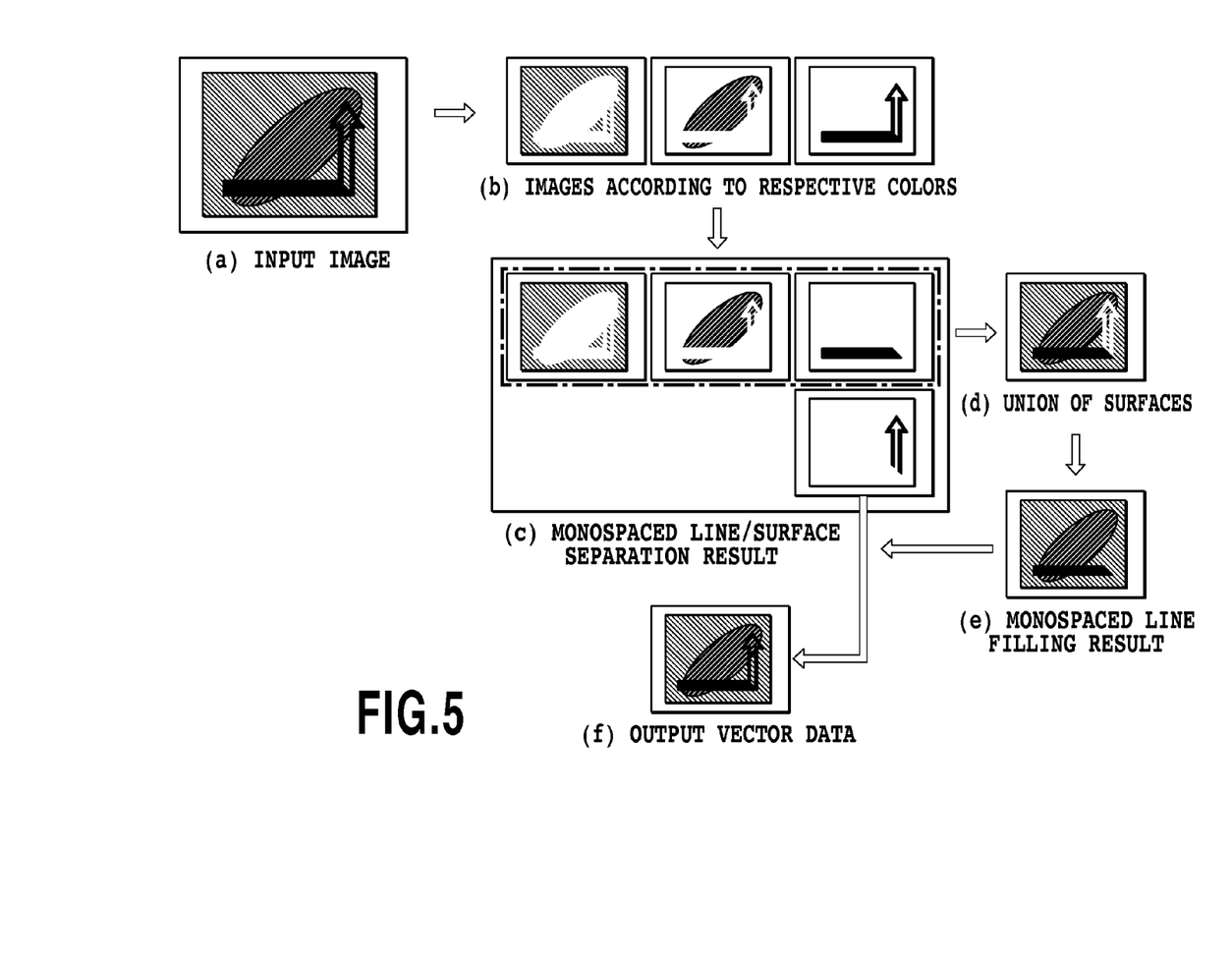
FIG. 5 is an illustration of a processing result which is obtained in a processing process in the embodiment of the present invention.

In step S403, based on the result of the color region division, the color region of the processing target is selected. Taking FIG. 5 as an example, in the case of the inputted image shown in FIG. 5 (*a*), three images according to respective colors are obtained as shown in FIG. 5(*b*). Here, the unprocessed region is selected among them. The processing is implemented in a processing region selecting unit 200 in FIG. 1.

In step S404, the color region selected as described above is dealt as a single-color image, and separation processing of the monospaced line and the surfaces is executed. More specifically, the input is regarded as a binary image, and distance transformation and thinning processing are executed. To each of the pixels obtained as a result of the thinning, a distance transformation value corresponding to its own pixel, and a distance transformation value of the adjacent pixel are added, and thereby, the original line width value is estimated for each of the pixels obtained by the thinning. Next, the thinning result is sectioned in the unit of an open end and an intersection, whereby core line information is generated, and by estimating dispersion of the line width value obtained for each pixel, a monospaced line region (i.e. a line having a constant line width) is determined. Further, based on the core line information determined as the monospaced line, surfaces are separated from the inputted image. When the images according to colors shown in FIG. 5 (*b*) are processed, the separation result shown in FIG. 5 (*c*) is obtained. The surface region is shown in the upper stage of FIG. 5 (*c*), and the monospaced line region is shown in the lower stage thereof. Accordingly, it can be understood that in the image shown in FIG. 5 (*a*), only the black region is divided into the monospaced line region and the surface regions, and the other regions are all constructed by surface regions. By application of the aforementioned method, (1) core line coordinates and line width information of a monospaced line, (2) pixel information expressing a monospaced line region, and (3) pixel information expressing a surface region can be obtained.

In step S405, it is confirmed whether or not all the color regions are processed, and if an unprocessed color region is present, the process returns to step S403, wherein a new color region is selected. The above processing is implemented in a monospaced line/surface separating unit 300 in FIG. 1.

After processing of all the color regions is finished, filling processing for the monospaced line region is executed in step S406. The details of the flow in step S406 will be described hereinafter with reference to FIGS. 6 and 7. First, in step S610, a union of sets of pixel information expressing surface regions of the respective colors obtained in step S401 through S405 is obtained. For example, the union obtained from the three color regions shown in FIG. 5 (*c*) is as shown in FIG. 5 (*d*). If there are the pixels which are not included in any surface region as a result that the union of the pixel information expressing the surface regions is obtained, the pixels are regarded as the pixels which express the position where the monospaced line region is present. Next, a raster scan is performed sequentially for the obtained union, the pixels at the position where the monospaced line region is present are detected, which then are filled as the filling region by using the color information of the adjacent surface regions around them. More specifically, the filling processing can be executed by using the color of the adjacent surface region, for example.

Figure 6:
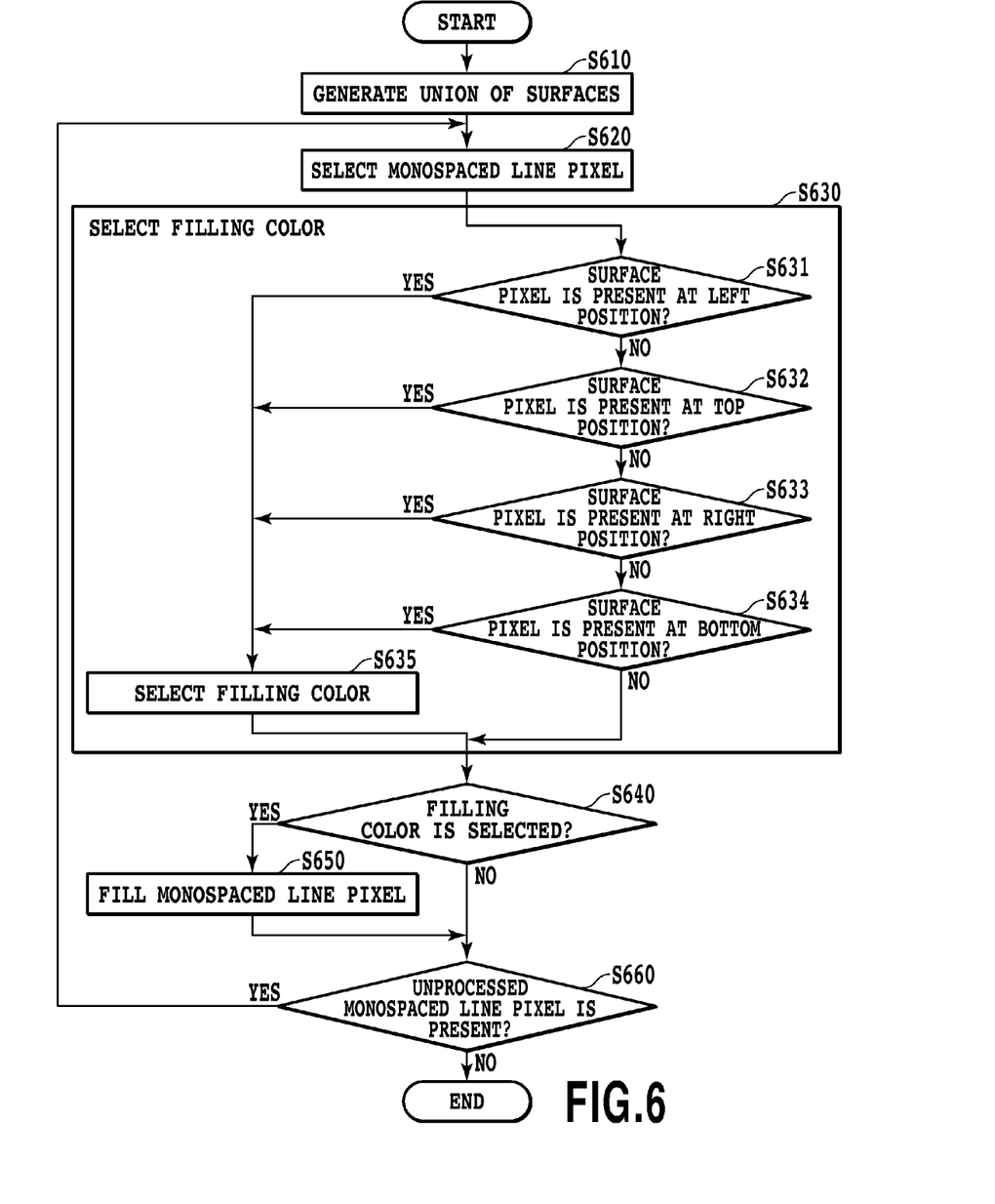
FIG. 6 is a flowchart of monospaced line region filling processing.

The unprocessed monospaced line pixels are selected in step S602, and in step S630, the filling color is selected with reference to the adjacent pixels. As for the filling color, the color of the existing surface region is selected with reference to the pixels at the top, the bottom, the left and the right of the monospaced line pixels in the image of the union of the surface regions to perform the filling. The colors originally retained by the pixels the color of which is replaced during the same raster scan, and the noted monospaced line pixels are excluded from the selection target. Thereby, the monospaced line region which is filled by one raster scan can be limited to one pixel width, and even if the surface regions having different colors are located at both sides of a thick line, the filling can be performed uniformly with the colors of both the sides by repeatedly performing the raster scan of the filling processing.

In steps S631 through step S634, the pixels located at the left, the top, the right and the bottom are respectively referred to, and it is confirmed whether the pixel which satisfies the aforementioned conditions is found. When the pixel is found, the reference processing of the following pixel positions is omitted, the process goes to step S635, and the color of the pixel position which is referred to immediately before the pixel is found is set as the filling color. In step S640, it is confirmed whether the filling color is selected, and if the filling color is selected, the filling processing is executed in step S650. If the filling color is not selected, the process goes directly to step S660 from step S640, wherein it is confirmed whether the filling for all the monospaced line pixels is finished. When an unprocessed monospaced line pixel is present, if a raster scan is underway, the next pixel in the sequence of the raster scan is selected when the process returns to step S620.

Figure 7:
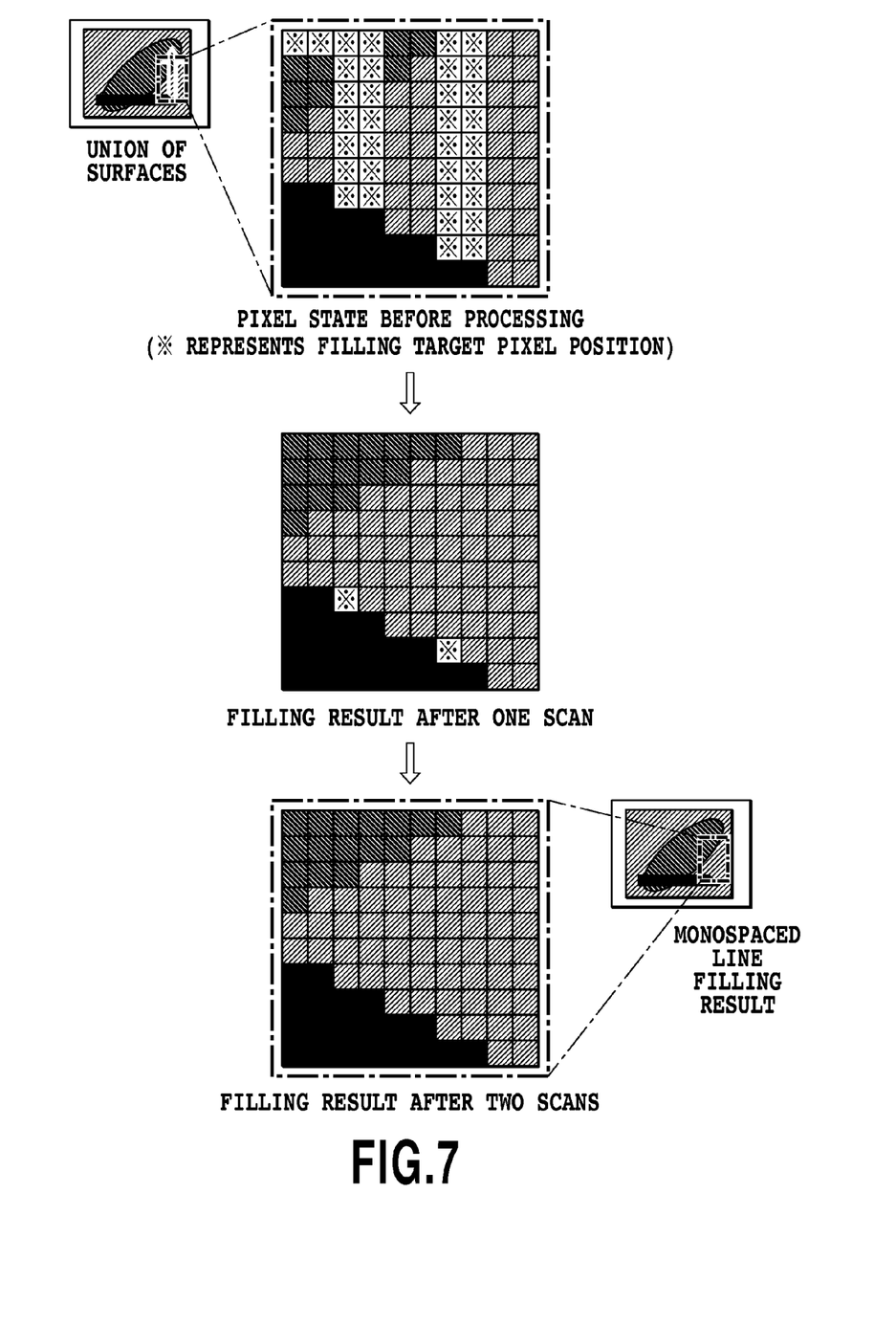
FIG. 7 illustrates a processing result obtained in the process of the monospaced line region filling processing.

When the last unprocessed pixel in the sequence of the raster scan is processed, the process returns to the head of the image, where the processing continues to be executed. By repeating the above processing, the filling of the monospaced line pixels can be performed by two raster scans, if the image shown in FIG. 7 is taken as an example. As a result, with reference to FIG. 5, when the union shown in FIG. 5 (*d*) is processed, the filling result shown in FIG. 5 (*e*) is obtained. The above processing is implemented in a monospaced line region filling unit 400 in FIG. 1.

The image after the filling of the monospaced line region is finished is the image constructed by only the surface regions, and therefore, in step S407, boundary-sharing type vectorization processing is executed for the image data of the filled surface regions. As the boundary-sharing type vectorization, the method of Japanese Patent Laid-Open No. 2008-146496 can be applied. First, the color regions are detected from the image having been filled, the boundary lines between the detected color regions are split at each of intersections of the boundary lines, and between the respective intersections of the boundary lines which are separated, the contour coordinates common to the adjacent color regions can be obtained.

With the above processing, the core line coordinates and the information of the line width of the monospaced line region are acquired in step S404, and in step S407, the contour coordinates for the surface region having been filled can be obtained. Therefore, in step S408, vector data generation processing is executed. For the monospaced line region, the coordinate information of the core line which is acquired is subjected to functional approximation, and the line width information is given to the data of the core line subjected to the functional approximation to generate vector data. Further, for the surface region, the contour coordinate information between the intersections of the boundary line which is obtained by splitting the boundary lines of the surface region having been filled at each intersection is subjected to functional approximation first, to generate the vector data between the intersections. By connecting the vector data between the intersections generated by performing the functional approximation in accordance with the boundary lines enclosing the respective color regions, the vector data of the surface region of each color is generated. For the functional approximation, the method of Japanese Patent Laid-Open No. 2008-146496 can be applied.

At the time of outputting the vector data, the vector data is outputted so that the vector data of the monospaced line region is displayed earlier than the vector data of the surface region is displayed. In many vector formats, the data which comes later is in the display order which is the earlier, and therefore, in this case, the data of the monospaced line region is outputted after the data of the surface region is outputted. For example, after the vector data of the surface region is described, the PDF file in which the vector data of the monospaced line region is described is generated, which will be outputted. As the result of the above, the input image shown in FIG. 5 (a) is processed, and thereby, the vector data without generation of a gap in the boundary between the monospaced line region and the surface regions, or between the surface regions shown in FIG. 5 (f) can be finally obtained. The above processing is implemented in a vectorization unit 500 in FIG. 1.

Embodiment 2

In the aforementioned embodiment 1, the union of the surface regions of the respective colors which are obtained as the result of the monospaced line/surface separation processing is obtained, and the pixels at which the monospaced line region is located are consecutively replaced with the colors of the adjacent surface regions to perform filling. However, the scope of the present invention is not limited to this, and the monospaced line region may be filled with the other methods. For example, with the method which replaces the pixels with a single color, the number of scans for the image which is required for filling processing is decreased, and the processing speed becomes high. As for selection of the filling color, one color may be selected from the surface regions to which the monospaced line region is adjacent, or the average color of the adjacent color regions may be used.

The embodiments according to the present invention are described above, and many of the processing of the embodiments are by the computer programs which are executed on the information processing apparatus. Therefore, such a computer program naturally comes within the scope of the present invention. More specifically, in the present invention, if such a computer program is executed on a computer, the computer is operated as the information processing apparatus of the present invention. The computer program is usually stored in a computer-readable storage medium such as the RAM 5, the ROM 6 or a CD-ROM, and can be executed by setting the storage medium in the computer, and copying or installing the computer program in the system. Accordingly, such a computer-readable storage medium also naturally comes within the scope of the present invention.

Other Embodiment(s)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-066346, filed Mar. 23, 2010, which is hereby incorporated by reference herein in its entirety.

What is claimed is:

1. An image processing apparatus, comprising:
   an image input unit for inputting an image including one or more color regions;
   a color region dividing unit for dividing the inputted image into regions according to respective colors;
   a monospaced line/surface separating unit for separating each of the divided color regions into a monospaced line region and a surface region;
   a monospaced line region filling unit for obtaining a union of the surface regions of the respective color regions separated by the monospaced line/surface separating unit, and filling an region where the separated monospaced line region is present in an image of the obtained union with a color of a surface region adjacent to the region; and
   a vectorization unit for generating vector data of a monospaced line based on the monospaced line region separated by the monospaced line/surface separating unit, and further generating vector data of the surface region based on a contour of a surface region extracted from an image having been filled by the monospaced line region filling unit.

2. The image processing apparatus according to claim 1, wherein the monospaced line region filling unit fills the region where the monospaced line region is present by repeatedly executing processing of filling each pixel width in sequence by using color information of the adjacent surface region.

3. The image processing apparatus according to claim 1, wherein the color region dividing unit divides the inputted image into the regions according to respective colors by dividing the inputted image into clusters according to the respective colors for removing a cluster of noise.

4. The image processing apparatus according to claim 1, wherein the vectorization unit generates data so that the vector data of the monospaced line region is displayed before the vector data of the surface region is displayed.

5. The image processing apparatus according to claim 1, wherein the vectorization unit generates vector data of a monospaced line expressed by a core line subjected to functional approximation based on the monospaced line region separated by the monospaced line/surface separating unit and a line width, and further generates vector data of a surface region expressed by a contour of the surface region subjected to functional approximation based on the contour of the surface region extracted from the image having been filled by the monospaced line region filling unit.

6. The image processing apparatus according to claim 1, wherein the vector data of the surface region generated by the vectorization unit includes vector data of the surface region of each color which is generated by separating contour coordinates of a boundary line of the surface region extracted from the image having been filled by the monospaced line region filling unit at each intersection, and connecting vector data between intersections generated by performing functional approximation to the contour coordinates between the intersections.

7. An image processing method, comprising:
- an image input step of inputting an image including one or more color regions;
- a color region dividing step of dividing the inputted image into regions according to respective colors;
- a monospaced line/surface separating step of separating each of the divided color regions into a monospaced line region and a surface region;
- a monospaced line region filling step of obtaining a union of the surface regions of the respective color regions separated in the monospaced line/surface separating step, and filling an region where the separated monospaced line region is present in an image of the obtained union with a color of a surface region adjacent to the region; and
- a vectorization step of generating vector data of a monospaced line based on the monospaced line region separated in the monospaced line/surface separating step, and further generating vector data of the surface region based on a contour of a surface region extracted from an image having been filled in the monospaced line region filling step.

8. A computer-readable storage medium storing a program executing a method by a computer, the method comprising;
- an image input step of inputting an image including one or more color regions;
- a color region dividing step of dividing the inputted image into regions according to respective colors;
- a monospaced line/surface separating step of separating each of the divided color regions into a monospaced line region and a surface region;
- a monospaced line region filling step of obtaining a union of the surface regions of the respective color regions separated in the monospaced line/surface separating step, and filing an region where the separated monospaced line region is present in an image of the obtained union with a color of a surface region adjacent to the region; and
- a vectorization step of generating vector data of a monospaced line based on the monospaced line region separated in the monospaced line/surface separating step, and further generating vector data of the surface region based on a contour of a surface region extracted from an image having been filled in the monospaced line region filling step.

* * * * *